United States Patent [19]

Fales et al.

[11] Patent Number: 5,242,181
[45] Date of Patent: Sep. 7, 1993

[54] HUMAN POWERED VEHICLE WITH IMPROVED DRIVE SYSTEM

[76] Inventors: H. Russell Fales, 4872 S. Tabor St., Morrison, Colo. 80465; Tyrus Sarnella, 9340 W. Ontario Dr., Litleton, Colo. 80123

[21] Appl. No.: 745,004

[22] Filed: Aug. 14, 1991

Related U.S. Application Data

[63] Continuation-in-part of Ser. No. 323,506, Mar. 13, 1989, abandoned.

[51] Int. Cl.$^5$ ............................................. B62M 1/04
[52] U.S. Cl. .................................. 280/251; 280/252; 280/253; 280/255; 280/256; 280/257; 280/258
[58] Field of Search ............... 280/214, 215, 217, 251, 280/252, 253, 255, 256, 257, 258, 220; 272/73

[56] References Cited

U.S. PATENT DOCUMENTS

| 1,562,553 | 11/1925 | Hansen | 280/215 |
|---|---|---|---|
| 1,876,859 | 9/1932 | Colella | 280/223 |
| 4,052,912 | 10/1977 | Vukelic | 74/512 |
| 4,379,566 | 4/1983 | Titcomb | 280/251 |
| 4,592,563 | 6/1986 | Dean et al. | 280/253 |
| 4,616,840 | 10/1986 | Green | 280/234 |
| 4,708,356 | 11/1987 | Levavi | 280/255 |

Primary Examiner—Richard M. Camby
Attorney, Agent, or Firm—John L. Isaac

[57] ABSTRACT

A human powered vehicle is disclosed. The vehicle includes a frame with the capability for supporting an operator one the frame. The vehicle further includes a drive wheel mounted for rotation to the frame, and a mechanism powered by the drive wheel to propel the vehicle. A device is also provided for rotating the drive wheel to operate the power mechanism. A pedal lever arm is mounted to the frame for reciprocating movement between first and second positions, and a cam member is operatively secured to the frame and said pedal lever arm for pivotal oscillating movement in response to reciprocal movement of the lever arm. Finally, a linkage couples the cam member with the drive wheel rotating device and is mounted for longitudinal reciprocating movement relative to the length of the frame in response to the oscillating movement of the cam member to operate the drive wheel rotating device.

43 Claims, 5 Drawing Sheets

HUMAN POWERED VEHICLE WITH IMPROVED DRIVE SYSTEM

RELATED APPLICATION

This is a continuation-in-part of U.S. patent application Ser. No. 07/323,506, filed Mar. 13, 1989, now abandoned.

BACKGROUND OF THE INVENTION

1. Field of the Invention

This invention relates generally to human powered vehicles and, more particularly, to vehicles of the foot-pedal type having an operator in a partially reclined position. Specifically, the present invention relates to human powered vehicles with drive mechanisms having significantly improved mechanical advantages.

2. Description of the Prior Art

Human powered vehicles of a wide variety of different types have been in existence for centuries. Of these, the conventional bicycle has perhaps been the most successful and widely accepted form of human powered vehicle. Despite the wide acceptance and use of traditional bicycles, such bicycles have a number of disadvantages which make improvements to its construction and/or design highly desirable. For example, the rotary pedals which are generally located at a position beneath the operator's seat are not well adapted for achieving maximum performance in transmitting power from the rider to the drive train and are also limited in their capacity for sudden changes in speed and direction. During the period in which the cranks of the bicycle pedals are aligned with riders legs, no torque is transmitted from the rider to the power train. In addition, the steering of a conventional bicycle is limited to steering the front wheel alone, while the braking is limited to slowing the rotation of one or both wheels.

Numerous attempts have been made over the years to try and overcome some of the above delineated obstacles and disadvantages of the conventional bicycle. U.S. Pat. Nos. 849,342, 2,638,359 and 4,379,566 are all directed to conventional two-wheel bicycles which are adapted in order to improve mechanical advantages in the torque applied by the operator of the vehicle, and in the efficiency of conversion of a vehicle operator's leg motion through the pedals to the drive train of the bicycle.

U.S. Pat. Nos. 1,562,553, 1,876,859 and 4,052,912 are all directed to variations of a traditional bicycle by including three or four wheels to the vehicle for improved stability as well as changes to the drive linkage mechanisms and the like in attempts to improve the transmittal of energy from the operator to the ultimate driving wheel or wheels.

In recent years, efforts to improve the efficiency of bicycles have taken several directions. One direction of thought deals with the improvement of gearing mechanisms to improve the efficiency of existing drive systems. Another major trend is in the development of recumbent bicycles wherein the operator is positioned in a reclined position moving their legs in a direction substantially parallel with the direction of movement of the vehicle. This also has permitted streamlining of the vehicle which, when in combination with improved gearing mechanisms, has developed recumbent bicycles capable of exceptionally high speeds. U.S. Pat. No. 4,592,563 disclosed one such recumbent vehicle which uses a traditional rotary pedal crank arrangement. U.S. Pat. No. 4,708,356 discloses another recumbent vehicle arrangement requiring two operators and includes a very sophisticated and complicated gearing mechanism which interconnects both foot pedals and arm levers used to power the vehicle. Other potential forms of human powered vehicles include water craft and various types of air craft. However, they have not yet been feasible due to lack of energy transformation efficiencies coupled with ultra-light weight construction. Thus, there remains a need for a human powered vehicle having high mechanical efficiencies operable by one operator, which vehicle could be in the form of a recumbent bicycle or other vehicles which, if the efficiencies are sufficiently high, are capable of taking the form of helicopters, airplanes, water craft and the like.

SUMMARY OF THE INVENTION

Accordingly, it is one object of the present invention to provide an improved human powered vehicle.

It is another object of the present invention to provide a human powered vehicle capable of adaptation to a variety of transportation forms such as bicycles, airplanes, water craft, helicopters and the like.

Yet another object of the present invention is to provide a human powered vehicle having an improved drive mechanism yielding significantly improved mechanical advantages and efficiencies.

A further object of the present invention is to provide a recumbent bicycle having an improved drive mechanism capable of propelling the recumbent bicycle at speeds well in excess of 65 mph.

Still another object of the present invention is to provide an improved human powered vehicle having performance capabilities sufficiently great so as to effectively compete with motorized vehicles as routine means of transportation.

In accordance with the above and other objects and advantages of the present invention, a human powered vehicle is provided and includes a frame having the capability of supporting an operator thereon. The vehicle further includes a drive wheel mounted for rotation to the frame, and a mechanism powered by the drive wheel to propel the vehicle. An apparatus is also provided for rotating the drive wheel to operate the power mechanism. A pedal lever arm is mounted to the frame for reciprocating movement between first and second positions, and a cam member is operatively secured to the frame for pivotal oscillating movement in response to reciprocal movement of the lever arm. Finally, a cable linkage couples the cam member with the drive wheel rotating apparatus and is mounted for longitudinal reciprocating movement relative to the length of the frame in response to the oscillating movement of the cam member to operate the drive wheel rotating apparatus.

BRIEF DESCRIPTION OF THE DRAWINGS

The accompanying drawings which are incorporated herein and form a part of the specification, illustrate preferred embodiments of the present invention and, together with the description, serve to explain the principles of the invention.

In the drawings:

FIG. 2A is a cross-sectional view taken substantially along line 2A—2A of FIG. 2;

FIG. 2B is a cross-sectional view taken substantially along line 2B—2B of FIG. 2;

FIG. 2C is a schematic of a ratchet mechanism useful with the present invention;

DETAILED DESCRIPTION OF THE INVENTION

Figure 1:
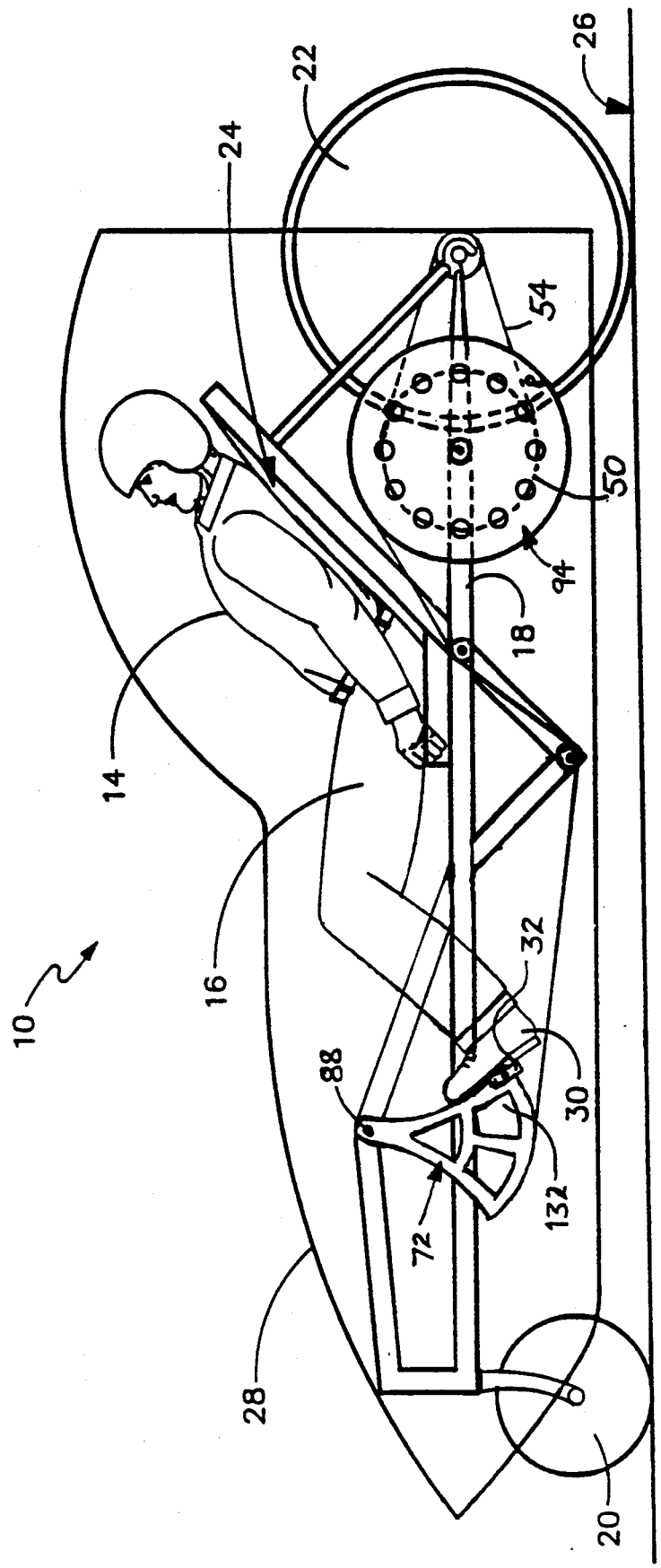
FIG. 1 is a side schematic view, with some parts in shadow, of a recumbent bicycle incorporating one embodiment of the drive mechanism of the present invention.

Referring to FIG. 1, there is illustrated a vehicle 10 incorporating the drive system of the present invention. The vehicle 10 includes a human powered drive system 12 (FIG. 2) that is operated by a human operator 14 by the reciprocal extension and contraction of the legs 16 of the operator 14. It should be noted that while the drive system 12 will be discussed in detail herein relative to its use in a recumbent bicycle structure, it should be clearly understood that the present invention is applicable to any type of human powered drive system such as a bicycle, boat, airplane, car, helicopter, hydrofoil, submarine, electric generator, exercise machine and the like. Thus, the present invention should no deem to be limited to its use solely as a recumbent bicycle structure, although its efficiencies will be discussed relative thereto.

As can be seen from FIG. 1, the vehicle 10 includes a chassis frame 18 having a front steering wheel or wheels 20 and a rear drive wheel (or wheels) 22 connected thereto. Any type of appropriate and known steering mechanism can be utilized to steer the vehicle 10, although hand levers (not shown) connected to the wheel or wheels 20 are preferred. Moreover, the steering wheels 20 may be single or double wheels depending on the desired steering mechanism. Further details of steering mechanisms will not be discussed herein.

A seating arrangement 24 is attached to the frame 18 to permit the operator 14 to sit comfortably in a partially reclined, recumbent position relative to the frame 18 and the ground surface 26 over which the vehicle 10 travels. In one form of the invention, a hood or shield 28 may be provided over the frame 18 and the operator 14 to reduce wind resistance and thereby increase speed efficiency of the vehicle 10. The vehicle 10 is operated by the operator 14 placing his feed 30 on pedals 32 and then extending and contracting the legs 16 of the operator 14 to move the pedals 32 in back-and-forth, reciprocating fashion discussed in greater detail below. This movement is translated to rotation of the rear wheel 22 to propel the vehicle 10 forwardly.

Referring to FIGS. 2, 2A, 2B and 3, one embodiment of the drive mechanism 12 is illustrated and explained in greater detail. The frame 18 may be sized and configured in any number of different manners and preferably includes a single longitudinal frame member 34 which extends the length of the vehicle 10 and functions as the main frame member to which the remaining portions of the frame 18 and the drive mechanism 12 are secured. The seat assembly 24 preferably includes a seat pad 36 secured directly to the main frame member 34, and a seat back pad 38 attached to a back frame 40 which extends angularly upwardly and rearwardly from the main frame 34 in a substantially reclined orientation. The frame member 40 is preferably strengthened by a strut 42 extending from the back of the frame element 40 to the main frame member 34. The frame 18 also preferably includes an upper frame element 44 for attaching a portion of the drive mechanism 12, and a plurality of lower frame elements 46 and 48, each of which preferably are in the form of angular members projecting downwardly beneath the main frame element 34 to provide attachment points for portions of the drive mechanism 12 as explained in further detail below. The positioning, sizing and shape of the members 46, 48 are variable depending upon the arrangement as well as the application (type of vehicle) of the drive mechanism 12.

The vehicle 10 is preferably propelled forwardly over the ground surface 26 by rotation of the rear wheel 22, although the device 10 may be modified to drive and rotate the wheel (FIG. 1). The rear wheel 22 is preferably rotate or turned by the rotation of a drive wheel 50. The drive wheel 50 rotates the rear wheel 22 by rotating the axle 52 by way of a drive chain or belt 54 and gearing mechanism 56. Any desired type of gearing mechanism, such as found in existing 10-speed bicycle arrangements, may be utilized for connecting the drive wheel 50 to the rear wheel 22 and may include gearing arrangements in the drive wheel 50 itself. Since such mechanisms are well known in the art, details with respect to such gearing mechanisms will not be further discussed herein.

The drive wheel 50 is rotated by the remaining portions of the drive mechanism 12 of the present invention. As previously indicated, the drive mechanism 12 is operated by extending the legs 16 of an operator 14 (see FIG. 1), the feet 30 of the operator 14 being placed against the pedals 32. In the illustrated embodiment of FIGS. 2-3, a pedal 32 is preferably mounted on one end of a pedal lever arm 58 which is pivotally attached at pivot point 60 to the upper frame member 44. The pedal lever arm 58 is adapted to reciprocate back and forth along the longitudinal axis 62 of the frame 18. The pedal 32 is preferably pivotally mounted on a pedal axle 64 to the lower, distal end of the lever arm 58 for free rotation thereabout. The upper end 66 of the pedal lever arm 58 freely moves back and forth in a reciprocating fashion in response to reciprocal movement of the lever arm 58. In this embodiment of the invention, a connecting rod 68 is attached to the freely movable end 66 of the pedal lever arm 58 and is pivotally connected thereto a pivot point 70.

The next main component of the drive mechanism 12 is a cam member 72 having an outer annular surface 74. In preferred form, the cam member 72 is in the form of a substantially semi-circular member with the annular surface 74 being a substantially semi-circular surface edge terminating at terminal points 76 and 78. A back member or edge 80 interconnects the terminal points 76 and 78 to form the illustrated substantially semi-circular shaped cam member 72. The cam 72 can be solid or it may include support struts 82 and 83 to reduce weight yet provide strength to the cam member 72. It should be understood that the cam member 72 may be constructed in any desired shape, including the bell shape illustrated in FIGS. 1 and 4, to provide the same function as described below, with the annular surface 74 having a substantially semi-circular shape, an oblong shape, or the like. A channel member 84 is preferably disposed along the length of the annular edge 74 to provide a central groove 86 along the edge thereof, as more clearly illustrated in FIG. 2A. The groove 86 is provided for receiving a cable linkage to be described below.

Figure 2:
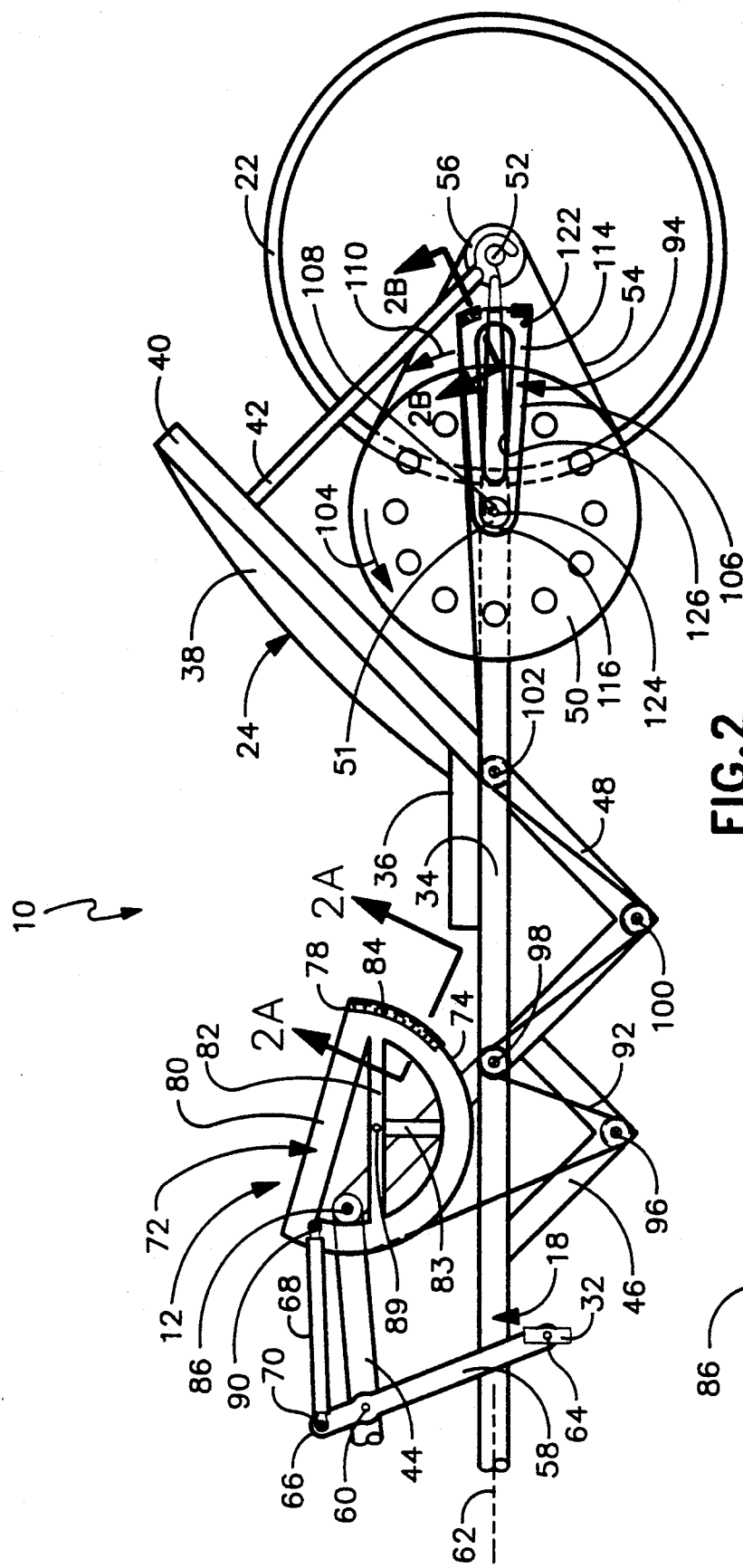
FIG. 2 is a side schematic view of another embodiment of the frame and drive mechanism of the present invention in its first or start position.
Figure 3:
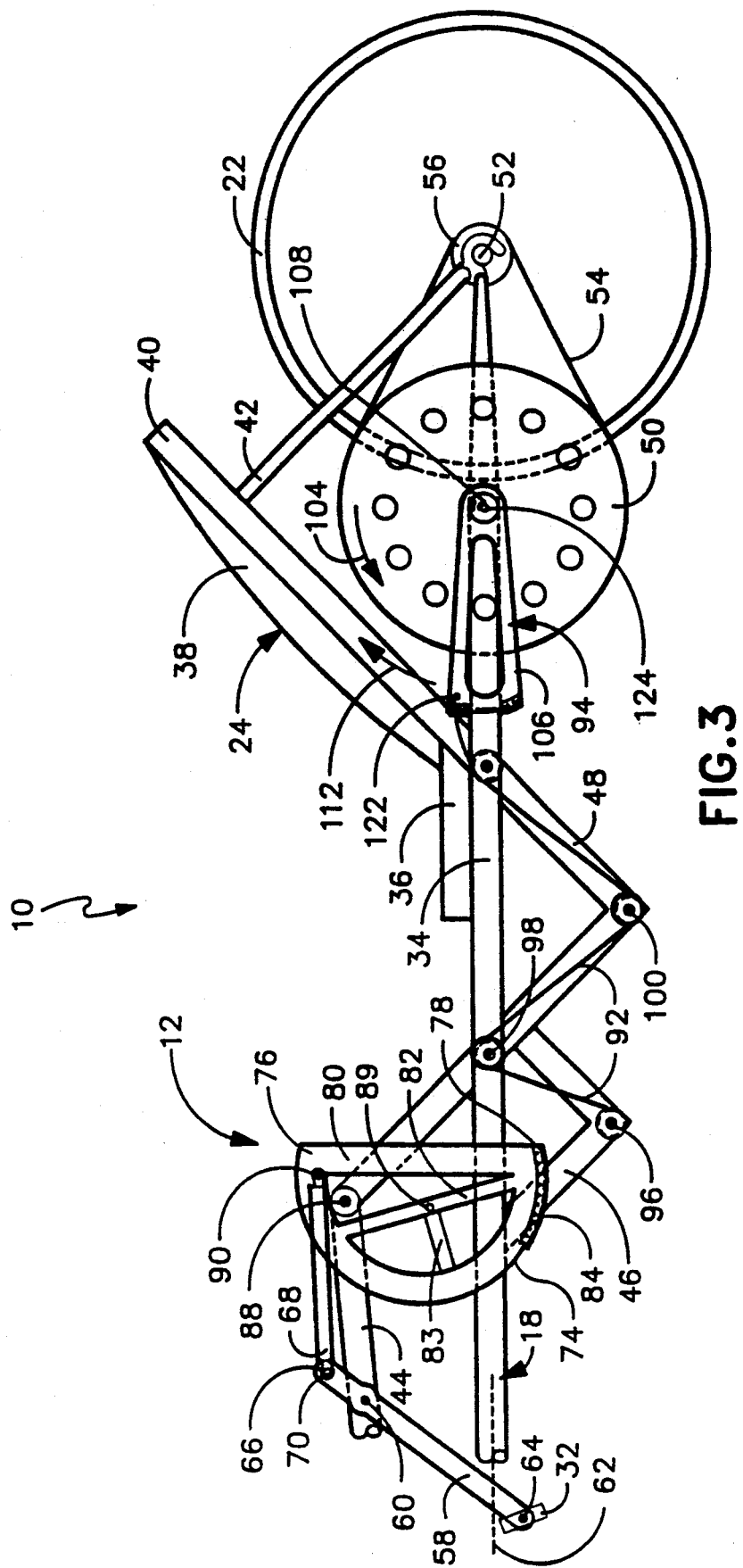
FIG. 3 is a view similar to that of FIG. 2 but illustrating the drive mechanism in its second or fully extended position.

In the embodiment illustrated in FIG. 2, the cam member 72 is connected to the upper frame member 44 with a pivot connection 88 which is located proximate the first terminal end 76 and spaced slightly inwardly from the annular surface edge 74. Thus, the pivot point 88 is off-set from the center 89 of the cam member 72 to provide the camming action by the member 72 as it pivots about the pivot point 88. In preferred form, the position of the drive mechanism 12 shown in FIG. 2 illustrates the first position of the cam member 72, while the position of the drive mechanism 12 shown in FIG. 3 illustrates the second position of the cam member 72 and of the pedal lever arm 58. The cam member 72 oscillates between its first position and its second position as illustrated in FIGS. 2 and 3 by pivoting about the pivot point 88 and is so oscillated as a result of the connection of the rod 68 to the cam 72 at pivot point 90. The pivot point 90 is positioned close to the terminal end 76. Thus, as the pedal lever arm 58 is moved from its first position illustrated in FIG. 2 to its second position illustrated in FIG. 3, the rod 68 pushes against the cam 72 to rotate the cam 72 from its first position as illustrated in FIG. 2 to its second position as illustrated in FIG. 3. When the pedal lever arm is returned to its first position, it automatically returns the cam member 72 to its first position thereby oscillating the cam member 72 between its first and its second positions in response to reciprocating movement of the pedal lever arm 58.

It should be noted that a return spring (not illustrated) can be utilized to urge the lever arm 58 from its first and its second position in opposition to a drive mechanism 12 return bias member described in detail below. This assists in maintaining a constant tension on the cable linkage 92 as described below.

In preferred form, a cable linkage 92 in the form of as single cable length interconnects the cam member 72 with a drive wheel rotation mechanism 94. While the preferred embodiment illustrates the linkage 92 as a single length of cable, preferably aircraft type, any sort of appropriate linkage might be utilized such as several lengths of cable linked together, small chain linkage and the like. The cable is sized so as to fit within the groove 86 along the annular surface edge 74 of the cam member 72 as the cam member 72 is moved from its first to its second position. The cable 92 is preferably connected at its forwardmost end to the first terminal end portion 76 of the cam member 72. The cable is then threaded through the groove 86 and extended downwardly to a first pulley 96. The cable is then wound around a series of additional pulleys 98, 100 and 102 which are disposed along the frame member 34 and the frame sections 46 and 48. Thus, the cable 92 contacts only a small portion of the annular surface 74 when the cam 72 is in its first position as illustrated in FIG. 2.

As the cam member 72 rotates about pivot point 88 with its second terminal end portion 78 moving forwardly toward the front of the frame 18, the cable 92 is wrapped within the groove 86 and is pulled forwardly toward the front of the frame 18. As this occurs, the cable 92 is wrapped about the annular surface 74 and wound onto the cam 72 thereby moving the cable 92 longitudinally along its length toward the front of the frame 18 until the cam member 72 has reached its fully extended second position as illustrated in FIG. 3. At this point, the cable 92 is wrapped about most of the entire surface edge 74. When the cam member 72 is returned to its first position, the cable 92 moves in a reverse direction and thus reciprocates back and forth longitudinally along its length in response to oscillatory movement of the cam member 72. Thus, as the cam member 72 moves from its first to its second position and pulls the cable 92 forwardly, the rear portion of the cable 92 is pulled forwardly and operates the drive wheel rotating mechanism 94 as described below.

The drive wheel 50 preferably rotates counter-clockwise in the direction indicted by the arrow 104 in order to rotate the axle 52 and the rear wheel 22. However, the direction of rotation may be modified as desired. In one embodiment as illustrated in FIGS. 2–3, the drive wheel rotating mechanism 94 preferably includes a crank arm 106 which is secured to the drive wheel axle 51 so as to turn the axle 51 in only one direction 104. To achieve this, the crank 106 is preferably secured to the axle 51 by way of a conventional ratchet mechanism 108 whereby the pawl 111 of the ratchet engages the teeth 109 thereof so as to rotated the axle 51 as the crank 106 is moved in the direction 110. As the crank 106 is returned to its first position as illustrated in FIG. 2, the pawl disengages the teeth of the ratchet 108 to permit the crank 106 to rotate in a direction 112 (FIG. 3) without engaging or in any way effecting the rotation of the axle 51. Thus, the drive crank 106 rotates the axle 51 in only one counter-clockwise direction 104 so as to rotate the drive wheel in the same direction 104.

As illustrated in FIGS. 2 and 3, the drive crank 106 is rotatable through at least a 180° arc from its first position shown in FIG. 2 to its second position as illustrated in FIG. 3. To achieve this full 180° arc, the upper portion of the distal end 114 of the drive crank 106 has a width dimension greater than the end portion 116 which is attached to the axle 51. As can be seen in FIG. 2B, the top end of the distal end portion 114 includes a channel 118 which forms a groove 120 therein for receiving the cable 92. In preferred form, the cable 92 extends across the entire width of the end portion 114 of the crank 106 and is then terminated through an aperture 122 at the far end of the top portion 114. In this manner, as the crank 106 is rotated from its first to its second position, it can be rotated through a full 180° arc as illustrated in FIG. 3. If the cable were to be attached to the near end of the top portion 114, then the crank 106 would not be rotated a full 180° but perhaps only 160°. In order to maximize the full efficiency of a leg thrust and movement of the pedal lever arm 58 from its first position to its second position, the arc through which the crank 106 travels is preferably close to a full 180°.

The ratchet mechanism 108 preferably includes a spring return member 124 which is biased to maintain the crank 106 in its first position as illustrated FIG. 2. This spring 124 is stronger than any optional spring member (not illustrated) connected to the lever 58 as described above. Thus, as the pedal lever arm 58 is moved from its first to its second position thereby oscillating the cam 72 from its first to its second position, the cam 72 takes up the cable length 92 along its annular edge 74 and thereby rotates the drive crank 106 a full 180° to the crank's second position. When the operator 14 of the vehicle 10 moves his leg rearwardly and releases pressure against the pedal 32 and the pedal arm lever 58, the spring return member 124 of the ratchet mechanism 108 pulls the crank 106 back to its first starting position as illustrated in FIG. 2. This movement of the crank 106 automatically returns the cam member 72 to its first position which simultaneously moves the pedal arm lever 58 to its first position thereby preparing the system for a second full cycle.

In preferred form, the drive crank 106 includes an open area 126 so as to reduce the amount of weight provided by the drive crank 106 yet permit strong structural support necessitated by its function. While the drive mechanism 12 has been described as a single system, a preferred embodiment includes a pair of levers 58 which are positioned on each lateral side of the main frame member 34. Likewise, there is a pair of cam members 72, each one linked to a lever arm 58 on the corresponding sides of the frame member 34. A cable linkage 94 interconnects each of the pair of cams 72 to the pair of crank arms 106, again each disposed on one side of the frame member 34. However, there is only one drive wheel 50 to which each of two cranks 106 is secured by its own ratchet mechanism. Thus, as one pedal lever arm 58 moves forwardly from its first to its second position thereby rotating its drive wheel crank 106 to engage the drive wheel axle 51 and rotate the drive wheel 50, the opposite pedal lever arm 58 is being returned from its second to its first position to load the drive mechanism on that side of the vehicle 10. Consequently, if the pedal lever arms 58 are moved in alternate reciprocating fashion, a force is continuously applied to the drive wheel shaft 51 through one of the two drive wheel cranks 106 at any given moment. Since the vehicle operator 14 is preferably in a substantially reclined recumbent position, the thrust output from the legs of the operator 14 are at a maximum efficiency. The gearing mechanism between the drive wheel 50, the shaft 51 and the rear support wheel 22 is preferably a standard ten-speed bicycle mechanism or any other similar gearing mechanism which permits the operator 14 to adjust the mechanical advantage and gearing arrangement of the invention under any particular operational condition.

The arrangement of the present invention provides a significant mechanical advantage over existing devices and structures. The cam is sized and shaped so that there is a gain in speed and travel of the cam member 72 relative to the pedal lever arm 58 as the pedal lever arm 58 is moved from its first to its second position. This increase of speed and travel of the cam member 72 likewise increases the speed of the cable 92 with the stroke of the pedal leer arm 58 and movement of the cam. This is due to the pivot point location of the cam member 72 relative to its size and shape.

Figure 4:
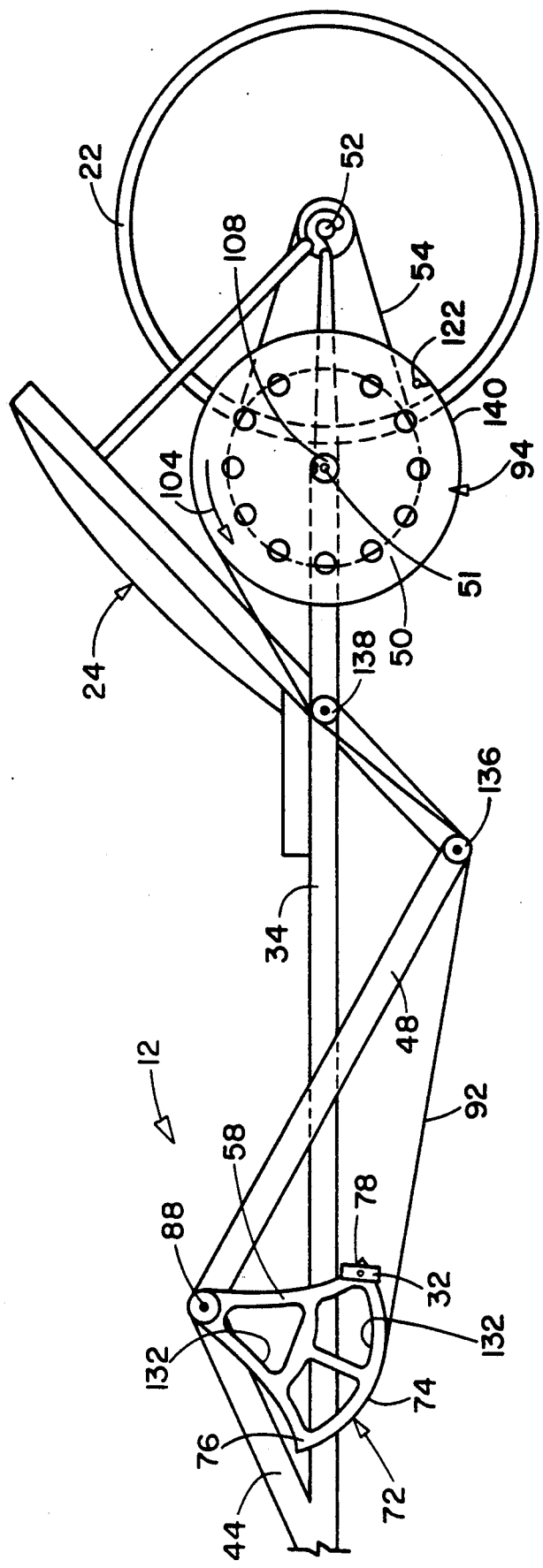
FIG. 4 is a side schematic view similar to that of FIG. 2 and illustrating the embodiment of the cam connection arrangement of the drive mechanism of the present invention as also illustrated in FIG. 1.
Figure 5:
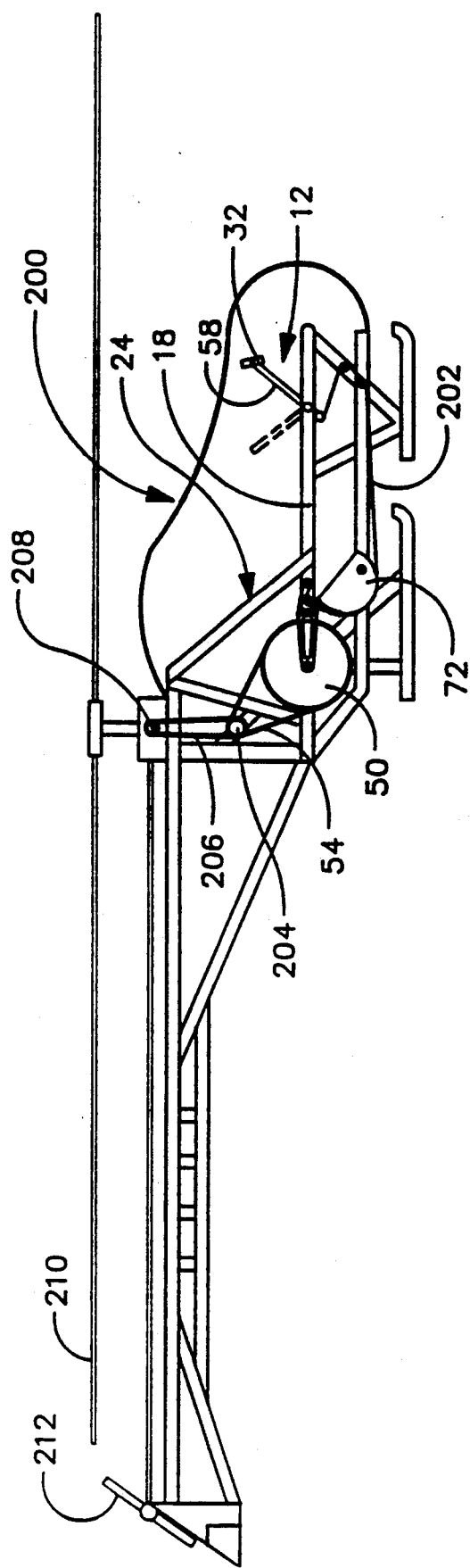
FIG. 5 is a side schematic view of a helicopter incorporating the human powered drive mechanism of the present invention therein.

In explaining the mechanical advantage of the drive system of the present invention, certain assumptions are made by way of example only. One assumption is that the pedal lever arm is 17.25 inches with 14 inches being from the pedal 32 to the pivot point 60 thereof. In addition, a main 52-tooth drive gear on the drive wheel 50 and a rear 5 or 7 speed axle 56 is assumed, although a 10-speed axle may be utilized. In a sitting position, as illustrated in FIG. 1, an operator applied force to the system by pushing feet 30 against the pedal 32 attached to the lever arm 58. When the pedal 32 is pushed, it directly applied force against the cam member 72 through the attached push rod 68 or directly as illustrated in FIGS. 1 and 4 as discussed below. A preferred distance from the push rod attachment point 90 to the pivot point 88 of the cam 72 is 2.5 inches, and the distance from the cam pivot point 88 to the furthermost outside point along the annular surface 74 equals 14 inches. The amount of cable travel 92 is relative to the cam diameter and the amount of cam rotation thereby controlling the amount of cable 92 being taken up onto the cam 72 as it rotates at point 88. This arrangement provides the cam 72 a mechanical advantage of 4:1 at its staring or first position.

An average operator 14 seated in the device 10 will generally provide a starting force of about 65 pounds at the beginning of a full stroke of the pedal lever arm 58. Since there is some loss of force during the lever actuating process of approximately 1.3:1 above the applied force, the cam 72 actually receives about 50 pounds. However, due to the 4:1 ratio of the cam, this 50 pound actual results in a 200 pound applied force which is maintained throughout the entire travel of the cam 72 and the ratcheted drive crank 106 at the rear of vehicle. However, as the operator's leg 16 extends, an increasing force will be applied by the average operator 14 to the pedal lever arm 58 by way of inherent human physiological and musculature abilities. As a result, the initial 65 pound actual force as starting will result in an ending force of about 260 pounds actual applied force at full leg extension. However, as the cam 72 rotates, it looses mechanical advantage proportionately from the 4:1 ratio to a minimum of 1:1.

As we apply an ever increasing actual force to the pedal lever arm 58, the cam 72 decreases in force equalizing the torque applied to the ratcheting drive arm 106. Thus, 260 pounds at the full extension of the pedal lever arm 58 equals approximately 200 pounds applied torque to the ratcheted drive arm 106, which is the same as at the beginning of the pedal lever arm stroke with an initial 65 pound application. Thus, an even flow of torque is applied to the drive crank 106 by the pedal lever arm 58 and cam member 72, and results in a consistent output of approximately 200 pounds torque (166.66 ft. pounds assuming a 10" lever) by the drive wheel 50. In this example, the output torque is six times greater than the same applied force to a standard 6.5 inch bicycle crank, with an increase of 45° travel of useful torque per stroke as compared to a bicycle crank.

While the size and shapes of the various components of the drive mechanism 12 can be varied, the ratcheted drive crank 94 or other drive wheel as discussed below is preferably 10 inches in length from its attachment point at the drive wheel axle 51 to its outermost edge 114 when the other components are as stated above. This provides a mechanical advantage of approximately 1.5:1 over a standard bicycle. The torque exerted by the drive crank 94 to the axle 51 is preferably passed through a main 120-tooth gear mechanism (not illustrated). A bearing system of conventional design may be utilized in the ratchet mechanism 108 which then permits the 120-tooth gear to coast, i.e. freely rotate, while the vehicle 10 also coasts. This arrangement reduces friction and loss of power to the vehicle 10 during coasting. The ratchet mechanism 108 and incorporated bearing system also assists the crank 94 to recover with the 120-tooth gear at a rate of approximately 100%. The 120-tooth gear of the drive wheel 50 arrangement is interconnected by the drive chain 54 to a variety of gears 56 disposed in the driven wheel 22, the gears 56 being in sets of five, ten and the like. These are, as previously described, typical bicycle gearing arrangements which are well known to the art.

While FIGS. 2-3 illustrate one embodiment of the invention, the cam member 72 may be interconnected to the pedal 32 in a variety of fashions with the cable linkage 92 being connected from the cam 72 to the drive wheel rotating mechanism 94 in somewhat different arrangements. Referring now to FIG. 4, an alternate and most preferred embodiment for the cam member 72 and the drive wheel mechanism 94 is illustrated. In this particular embodiment, the cam member 72 is in the form of a bell shape wherein the pedal lever arm 58 forms one arcuate side of the bell-shaped cam member 72. In this embodiment, then, the pedal 32 is attached directly to the cam member 72 at terminal point 78. The functioning of this bell-shaped cam 72 is the same as in the previous embodiment with the cable 92 being wrapped around the annular surface 74 as the pedal 32 is moved forwardly by an operator thereby rotating the cam member 72 and lever arm 58 about their common pivot point 88. Preferably, the bell-shaped cam member 72 included open areas 132 to reduce its weight.

In this embodiment, the cable 92 is linked from the cam member 72 to the drive wheel mechanism 94 by way of two cable pulleys 136 and 138. This arrangement shortens the length of the cable 92 necessary to operate the vehicle 10 and thereby reduces the length of the throw of the lever arm 58 necessary to fully oscillate and rotate the cam member 72.

The drive mechanism 94 is also an alternate, but preferred, embodiment in this FIG. 4. In this instance, the drive wheel mechanism 94 includes the drive wheel 50 mounted on the axle 51 and is rotated in the direction 104 by the rotation of a crank wheel 140 instead of the crank arm 106 illustrated in the prior embodiment. The crank wheel 140 operates in much the same manner as the crank arm 106. The cable 92 is engaged along the annular surface of the wheel 140 and is attached and terminated through an aperture 122 proximate the edge surface of the wheel 140. The wheel 140 is secured to the axle 51 by a conventional ratchet mechanism 108 as in the prior embodiment and operates to rotate the drive wheel 50 in a manner similar to the crank arm 106 of the prior embodiment. In this instance, the crank wheel 140 rotates in the direction of arrow 104 when the cam member 72 is moved forwardly, thereby rotating the drive wheel. The advantage of the crank wheel 140 over the crank arm 106 is that the wheel shape of the crank wheel 140 results in a more even distribution of motion forces and is in better balance than the crank arm 106. It also eliminates the possibility of overthrow as is possible with the crank arm 106.

As is evident from above, a unique drive mechanism is provided by the present invention which incorporates a pedal lever arrangement, a camming mechanism and a rotation crank device so as to provide high mechanical advantages in translating pedal lever movement to the rotation of a drive wheel. In the embodiments illustrated in FIGS. 1-4, this drive mechanism 12 of the invention has been applied to a recumbent bicycle structure. However, as previously indicated, this drive mechanism is applicable to any type of human powered vehicle. Referring to FIG. 8, a helicopter 200 is illustrated. The helicopter 200 includes a drive mechanism 12 similar to that of the prior embodiments. In this instance, the helicopter 200 includes a main frame 18 upon which is mounted an operator support structure 24. The operator sits in the operator support structure 24 similar to the prior embodiments and uses his legs to reciprocally move pedal crank levers 58. In this instance, the pedal crank levers 58 are oriented pointing upwardly so that the pedals 32 are at the top end of the levers 58 rather than at the bottom end as in the prior embodiments. A linkage mechanism 202, of any appropriate construction, interconnects the pedal levers 32 to the cam member 72 which operates in a manner similar to the prior embodiments. The cam member 72 oscillates between first and second position so as to rotate a drive wheel 50 through use of a cable linkage (not illustrated).

The drive wheel 50 is connect by linkage or belt 54 to a mechanism for operating the helicopter 200. In this particular embodiment, the mechanism includes a pulley member 204 which is interconnected by linkage 206 to a blade rotation arrangement 208. The blade rotation arrangement 208 rotates both the main propeller 210 and the rear propeller 212 so as to operate the helicopter 200 by reciprocally moving the pedal levers 58. The functioning of the helicopter 200 illustrated in FIG. 8 is extremely dependent on the weight of the device and operator relative to the mechanical advantages of the linkage mechanism between the pedal lever arm 58 and the blade rotation mechanism 208. Other devices which can be adapted for human power using the drive mechanism of the present invention also include water craft, airplanes, exercise devices, automobiles and any other type of device which presently is being powered by electric or fossil fuel motors. The significant mechanical advantages of the present invention permit tremendous power to be produced by an average human operator.

As can be seen form the above, the present invention provides a novel human powered drive mechanism adaptable to a wide variety of different vehicles. The mechanical advantages permit the human operator to produce enormous power and torque for the amount of effort and work put forth. This is achieved by the novel interrelationship of the components of the drive mechanism of the present invention. As can be seen, the present invention is simple to operate and construct, yet is adaptable to many vehicles so as to eliminate pollution, cost of fuel and maintenance and the like. This particular device, when applied to a recumbent bicycle, is capable of permitting a recumbent bicycle to achieve speeds in excess of 65 miles per hour, which is the maximum highway speed permitted within the United States. Thus, the present invention is a viable alternative for vehicular traffic, particularly within cities, which permits fast transportation without the congestion, gas fumes, cost and maintenance of present means of people transportation.

The foregoing description and illustrative embodiments of the present invention have been shown in the drawings and described in detail in varying modifications and alternate embodiments. In should be understood, however, that the foregoing description of the present invention is exemplary only, and the scope of the present invention is limited only to the claims as interpreted in view of the prior art.

We claim:
1. A human powered vehicle comprising:
   a chassis frame having front and rear portions and a longitudinal axis defined between said front and rear portions and aligned along the general direction of travel of the vehicle;

means for supporting an operator on said frame;

a vehicle propelling member mounted for rotation on said frame to move said vehicle;

a drive wheel mounted for rotation on said frame to rotate said vehicle propelling member;

a reciprocating crank member mounted to said frame and coupled with said drive wheel to rotate said drive wheel to operate said vehicle propelling member;

a pedal lever arm mounted to said frame for reciprocating movement between first and second positions;

a cam member operatively secured to said frame and said pedal lever arm for pivotal oscillating movement in response to reciprocal movement of said lever arm; and a linkage member having two ends with the first such end coupling to said cam member and its second such end coupling to said reciprocating crank member, said linkage member being mounted for longitudinal reciprocating movement generally along the longitudinal axis of said chassis frame in response to the oscillating movement of said cam member to operate said reciprocating crank member.

2. The vehicle as claimed in claim 1, wherein said reciprocating crank member comprises a drive axle for mounting said drive wheel, and a reciprocating crank secured to said axle for selective rotation thereof, the outer edge of said crank being attached to the second end of said linkage member.

3. The vehicle as claimed in claim 2, wherein said reciprocating crank member further comprises ratchet means securing said crank member to said axle to rotate said axle in one direction only while permitting free rotation in the opposite direction.

4. The vehicle as claimed in claim 3, wherein said reciprocating crank member oscillates between first and second positions corresponding to first and second positions of said pedal lever arm, the outer edge of said reciprocating crank member rotating through an arc of up to 180° between said first and second oscillation positions.

5. The vehicle as claimed in claim 4, wherein said reciprocating crank member comprises a crank wheel having its center secured to said axle.

6. The vehicle as claimed in claim 4, wherein said drive member comprises a crank arm having one ned secured to said axle.

7. The vehicle as claimed in claim 6, wherein said cable means is secured to the distal end of said drive crank.

8. The vehicle as claimed in claim 7, wherein the distal end of said drive crank has a width dimension greater than that of the end secured to said ratchet means and includes a groove disposed therein for receiving said cable means across the top thereof.

9. The vehicle as claimed in claim 1, wherein said vehicle comprises a pair of pedal arm levers, each connected to one said cam member, one said linkage member and one said reciprocating crank member to jointly drive a single drive wheel.

10. The vehicle as claimed in claim 9, wherein said pedal arm levers operate independently of each other.

11. The vehicle as claimed in claim 10, wherein said pedal arm levers reciprocate opposite from each other so that one said lever is always transmitting motion to said drive wheel.

12. The vehicle as claimed in claim 1, wherein said cam member is mounted to pivotally oscillate between first and second positions corresponding to the first and second positions of said lever arm, the first positions of said lever arm and of said cam member being spaced proximate said operator support means whereby said lever arm and said cam member move away from said operator support means when moving from their first to their second positions.

13. The vehicle as claimed in claim 12, wherein said reciprocating crank member comprises a reciprocating crank mounted for partial rotation between a first and a second position to rotate said drive wheel, said reciprocating crank moving in an arc from said first to said second positions in direct response to movement of said lever arm and said cam member from their first to their second positions.

14. The vehicle as claimed in claim 13, wherein said reciprocating crank member further includes ratchet means for rotating said drive wheel when said reciprocating crank member moves from its first to its second position and further including spring bias means for retuning said crank member from said second to said first positions without affecting drive wheel rotation.

15. The vehicle as claimed in claim 1, wherein said linkage member comprises a length of cable interconnecting said cam member at one end and said crank member at its other end.

16. The vehicle as claimed in claim 15, wherein said cam member is mounted to said frame for pivotal oscillation between first and second positions corresponding to first and second positions of said pedal lever arm, said cable being secured to said cam member for winding thereon as said cam member moves from its first to its second position.

17. The vehicle as claimed in claim 16, wherein the outer surface of said cam member defines a circumferential groove therein for receiving said cable.

18. The vehicle as claimed in claim 17, wherein said cam member includes an outer annular circumferential surface having first and second end portions defining the terminal portions of said surface, said cam member being pivotally attached to said frame means with said groove being disposed in said annular surface between said first and second end portions.

19. The vehicle as claimed in claim 18, wherein said cam member is sized and shaped such that said cable is wound along said annular circumferential surface one time as said cam member moves from said first to said second position in response to movement of said lever arm from its first and its second position, the distance between the first and second positions of said lever arm comprising a full pedal lever arm throw to move said cam member fully from its first to its second position thereby maximizing operation of said reciprocating crack members.

20. The vehicle as claimed in claim 17, wherein said reciprocating crank member comprises a drive axle for mounting said drive wheel, and a reciprocating crank having an annular outer surface and secured to said axle for selective rotation of said axle in one direction, the outermost surface of said reciprocating crank being attached to said cable in a manner to permit said crank to rotate through an arc of up to 180° between first and second positions corresponding to first and second positions of said cam member.

21. The vehicle as claimed in claim 20, wherein the annular outermost surface of said reciprocating crank defines a groove therein for receiving said cable for attachment to a far edge thereof to provide a full 180° arc movement of said crank in response to a complete movement of said cam member from its first to its second position.

22. The vehicle as claimed in claim 21, wherein said reciprocating crank member further comprises ratchet means interconnecting said reciprocating crank to said axle for rotating said axle in one direction only and further including spring return means for moving said crank member from its second to its first position without engaging said drive axle.

23. The vehicle as claimed in claim 1, wherein said cam member is mounted to said frame for pivotal oscillation between a first and second position corresponding to the first and second positions of said pedal lever arm, said vehicle further including means for operatively interconnecting said pedal lever arm to said cam member to move said cam member from its first to its second position in response to movement of said pedal lever arm from its first to its second position.

24. The vehicle as claimed in claim 23, wherein said cam member comprises a substantially semi-circular member defining a substantially semi-circular surface edge having first and second terminal ends, said cam member being pivotally connected to said frame means proximate said first terminal end of said edge at a position spaced inwardly from said edge, and wherein said pedal lever arm comprises a pedal crank having a foot pedal disposed on one end thereof with its opposite end being freely movable, said pedal crank being pivotally connected to said frame means at a point along its length spaced from said freely movable end.

25. The vehicle as claimed in claim 24, wherein said interconnecting means comprises a rod interconnecting the freely movable end of said pedal crank and the first terminal end of said cam member, said rod having pivotal connections at each end thereof to permit relative pivotal movement between said rod and each of said cam member and said pedal crank.

26. The vehicle as claimed in claim 23, wherein said cam member comprises a member having a substantially semi-circular circumferential surface terminating in first and second ends and having said pedal lever arm forming one side of said member to form a single unit having a pedal disposed at said second end, said single unit being pivotally mounted to said frame.

27. The vehicle as claimed in claim 26, wherein said cam member is substantially bell-shaped with two arcuate sides terminating at said first and second ends, one said arcuate side forming said pedal lever arm.

28. The vehicle as claimed in claim 1, wherein said human power vehicle is selected from the group consisting of a recumbent bicycle, a helicopter, an airplane, an automobile, an exercise device and a water surface craft.

29. In a human powered vehicle including a frame having a front portion and a rear portion, means for supporting an operator on said frame, a vehicle propelling member mounted for rotation on said frame to move said vehicle, a drive wheel mounted to rotate said vehicle propelling member, and pedal lever means mounted for reciprocating movement on said frame operable by said vehicle operator, the improvement comprising:

a cam member pivotally secured to the front portion of said frame forward of said operator support means and operatively secured to said pedal lever means for pivotal oscillating movement between first and second positions in response to reciprocal movement of said lever means; a drive wheel crank secured to the rear portion of said frame for reciprocating movement to rotate said drive wheel and propel said vehicle; and a cable linkage having front and rear terminal ends coupling said cam member at said front terminal end with said drive wheel crank at said rear terminal end to reciprocally rotate said drive wheel crank in response to the oscillating movement of said cam member, said cable linkage winding and unwinding around said cam member and said drive wheel crank in response to oscillations thereof.

30. The improvement of claim 29, wherein said cam member includes an outer annular surface defining a circumferential groove therein for receiving said cable linkage, said linkage being wound and unwound around said cam member in response to oscillations thereof.

31. The improvement of claim 30, wherein said annular circumferential surface includes first and second end portions defining the terminal portions of said surface and said groove, said cam member being pivotally attached to said frame substantially equidistantly from said first and second end portions.

32. The improvement of claim 31, wherein said cam member comprises a substantially semi-circular member wherein said annular surface is defined by a substantially semi-circular surface edge having said groove disposed along the length of said edge, said terminal ends defining the ends of said substantially semi-circular surface, said pedal lever means comprising a pedal crank having a foot pedal disposed on one end thereof.

33. The improvement of claim 32, wherein the end of said crank opposite said pedal is a freely movable end with said crank being connected to said frame at a point along its length spaced from said freely movable end, and wherein said crank is interconnected to said cam member by a linkage rod connecting the freely movable end of said crank and the first terminal end of said same member, said rod having pivotal connections at each end thereof to permit relative pivotal movement between said rod and each of said cam member and said pedal crank.

34. The improvement of claim 32, wherein the end of said pedal crank is intimately formed with said cam member as one side portion thereof to form a single until and is pivotally attached to said frame at the same point of attachment as said cam member.

35. The improvement of claim 34, wherein said cam member is substantially bell-shaped.

36. A recumbent bicycle comprising:
a frame having front and rear support wheels and a longitudinal axis defined therebetween;
means for supporting an operator in at least a partially reclined position on said frame intermediate said wheels;
a drive wheel mounted for rotation on said frame proximate said rear wheel and arranged to rotate said rear wheel to propel said bicycle;
means interconnecting said drive wheel with said rear support wheel to rotate said support wheel and propel said bicycle;
a reciprocating crank member coaxially mounted with said drive wheel to said frame for rotating said drive wheel;
a cam member having an integral pedal member and being operatively secured to said frame between said front support wheel and said operator support means for pivotal oscillating movement between first and second positions in response to reciprocal movement of said pedal member; and a linkage member having first and second ends coupling said cam member at said first end with said reciprocating crank member at said second end for longitudinal reciprocating movement along said frame axis in response to the oscillating movement of said cam member to operate said reciprocating crank member and propel said vehicle.

37. The recumbent bicycle as claimed in claim 36, wherein said reciprocating crank member comprises a drive axle for mounting said drive wheel, and a reciprocating crank wheel secured at its center to said axle for selective rotation thereof with the circumferential edge of said wheel being attached to the second end of said linkage member.

38. The recumbent bicycle as claimed in claim 37, wherein said reciprocating crank member further comprises ratchet means securing said reciprocating crank wheel to said axle for rotating said axle and said drive wheel in one direction while permitting free rotation of said crank wheel relative to said axle in the opposite direction, said reciprocating crank wheel being rotatable through an arc of up to 180° between first and second positions corresponding to the first and second positions of said cam member.

39. The recumbent bicycle as claimed in claim 38, wherein said linkage member comprises a cable linkage, and wherein the outer edge of said reciprocating crank wheel includes a longitudinal groove disposed therein for receiving said cable linkage across the top thereof to permit a full 180° arc rotation of said reciprocating crank wheel.

40. The recumbent bicycle as claimed in claim 36, wherein said bicycle includes a pair of said cam members with pedal members, each with one said linkage member and one said reciprocating crank member to jointly drive a single drive wheel, each said pedal member and cam operating independently of each other.

41. The recumbent bicycle as claimed in claim 39, wherein said cable linkage is secured to said cam member for winding and unwinding thereon, said cam member moving from its first to its second position in response to movement of said pedal member from its first to its second position by an operator positioned on said operator support means.

42. The recumbent bicycle as claimed in claim 41, wherein said cam member includes an outer annular circumferential surface having first and second end portion defining the terminal points of said annular surface, said cam member being substantially bell-shaped and pivotally attached to said frame proximate the top of said bell-shape, and wherein the outer annular surface defines a circumferential groove therein between said first and second end portions for receiving said cable linkage.

43. The recumbent bicycle as claimed in claim 42 wherein said ratchet means further including spring bias means for returning said reciprocating crank wheel from its second to its first positions thereby returning said cam and said pedal lever from their second to their first positions.

* * * * *